United States Patent
Elliott et al.

(10) Patent No.: US 10,885,711 B2
(45) Date of Patent: Jan. 5, 2021

(54) VIRTUAL REALITY IMAGE COMPOSITING

(71) Applicant: MICROSOFT TECHNOLOGY LICENSING, LLC, Redmond, WA (US)

(72) Inventors: Jack Elliott, Seattle, WA (US); Andrew Yeung, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 40 days.

(21) Appl. No.: 15/586,103

(22) Filed: May 3, 2017

(65) Prior Publication Data

US 2018/0322669 A1 Nov. 8, 2018

(51) Int. Cl.
*G06T 19/00* (2011.01)
*G06T 5/00* (2006.01)
(Continued)

(52) U.S. Cl.
CPC ............ *G06T 19/006* (2013.01); *A63F 13/20* (2014.09); *A63F 13/25* (2014.09); *G06T 5/006* (2013.01);
(Continued)

(58) Field of Classification Search
CPC ............. G06T 19/006; G06T 2219/024; G06T 15/205; G06T 19/00; G06T 2215/16; G06T 2200/24; G06T 3/4038; G06F 3/011; G06F 3/04815; G06F 3/147; G06F 3/012; G02B 2027/011; H04N 13/111; A63F 13/26; A63F 13/30; A63F 13/35; A63F 13/12;
(Continued)

(56) References Cited

U.S. PATENT DOCUMENTS 7,928,977 B2 4/2011 Tanimura et al.
9,311,753 B2 4/2016 Wilkinson
(Continued)

FOREIGN PATENT DOCUMENTS

WO 2016191467 A1 12/2016

OTHER PUBLICATIONS

"Google VR NDK walkthrough", http://web.archive.org/web/20170302143846/https:/developers.google.com/vr/android/ndk/gvr-ndk-walkthrough, Published on: Mar. 2, 2017, 23 pages.
(Continued)

*Primary Examiner* — Xiao M Wu
*Assistant Examiner* — Scott E Sonners
(74) *Attorney, Agent, or Firm* — Ray Quinney & Nebeker; Tiffany Healy (57) ABSTRACT

Methods and devices for performing one step compositing may include receiving at least a first surface from a first image source and a second surface from a second image source. The methods and devices may include generating a composite image with a combined first surface and second surface by contemporaneously applying position corrections to the first surface and the second surface and lens distortion corrections to the first surface and the second surface and blending the first surface and the second surface into respective positions in the composite image. The methods and devices may include transmitting the composite image representing a virtual environment for presentation to a downstream consumer.

23 Claims, 8 Drawing Sheets

(51) Int. Cl.
*A63F 13/25* (2014.01)
*G06T 15/50* (2011.01)
*A63F 13/20* (2014.01)
*G06T 11/60* (2006.01)

(52) U.S. Cl.
CPC .... *G06T 15/503* (2013.01); *A63F 2300/8082* (2013.01); *G06T 11/60* (2013.01); *G06T 2207/20221* (2013.01)

(58) Field of Classification Search
CPC ......... A63F 2300/303; A63F 2300/572; G09G 5/377
See application file for complete search history.

(56) References Cited

U.S. PATENT DOCUMENTS

| | | |
|---|---|---|
| 2006/0038880 A1 | 2/2006 | Starkweather et al. |
| 2008/0030429 A1 | 2/2008 | Hailpern et al. |
| 2010/0045783 A1 | 2/2010 | State et al. |
| 2011/0234584 A1 | 9/2011 | Endo |
| 2014/0375687 A1 | 12/2014 | Tanaka |
| 2015/0146047 A1 | 5/2015 | Ehara |
| 2015/0243078 A1* | 8/2015 | Watson ................ G02B 27/017 345/547 |
| 2015/0348327 A1* | 12/2015 | Zalewski ................. G06F 3/01 345/419 |
| 2017/0018121 A1* | 1/2017 | Lawson .................. G06T 17/00 |
| 2018/0329762 A1* | 11/2018 | Li ........................... G06F 9/542 |
| 2019/0057537 A1* | 2/2019 | Ohba ..................... G06T 15/20 |
| 2019/0094981 A1* | 3/2019 | Bradski ............... H04N 13/204 |

OTHER PUBLICATIONS

Lustig, et al., "Motion compensated automatic image compositing for GoPro videos", In Proceedings of ACM SIGGRAPH Posters, Jul. 24, 2016, 2 pages.

Bajura, et al., "Dynamic Registration Correction in Video-Based Augmented Reality Systems", In Proceedings of the IEEE Computer Graphics and Applications, vol. 15, Issue 5, Sep. 1995, pp. 52-60.

Korkalo, et al., "Real-time depth camera tracking with CAD models and ICP", In Journal of Virtual Reality and Broadcasting, vol. 13, Issue 1, Jan. 2016, 18 pages.

"International Search Report and Written Opinion Issued in PCT Application No. PCT/US18/028755", dated Jul. 19, 2018, 12 Pages.

* cited by examiner

VIRTUAL REALITY IMAGE COMPOSITING

BACKGROUND

The present disclosure relates to computer graphics systems, and more particularly, to presenting images on a display.

One area of computing devices that has grown in recent years are gaming devices and virtual reality (VR) devices, which use a graphics processing unit (GPU) to render graphics from a computing device to a display device based on rendering instructions received from the computing device. In gaming devices, a scene produced on a display device can be oriented or modified based on user input (e.g., movement of an external controller to cause movement of the orientation of the scene, introduction of items into the scene, etc.). Similarly, in VR devices, the scene produced on a display device can be oriented or modified based on user input, where the input may include detecting movement of the user's head (e.g., detected movement of a component of the VR device, such as a head mounted display (HMD)).

In existing systems, one application may have total control of the virtual environment and thus may easily combine multiple source images into a final, displayed image.

A problem arises, however, when different virtual reality (VR), mixed reality (MR), and/or augmented reality (AR) images from different sources with a different coordinate systems are received and need to be reconciled with the virtual environment. Thus, compositing of VR, MR, and AR may need to occur in scenarios where the compositor has no control over the input image sources.

Further, applying typical compositing solutions to this scenario would lead to using different rendering pipelines for the different source images. In this case, the different rendering pipelines separately perform lens distortion (e.g., including barrel distortion and chromatic aberration) and head position corrections, and then the compositing solution re-projects and combines the images. This multi-step process is inefficient and time consuming, as it involves multiple pixel sampling and rendering operations, followed by re-sampling and re-rendering to generate the composited image in the virtual environment. This resource and time inefficiency may lead to a less than desirable user experience, as in VR, MR, AR rendering it is desired to present the images with as little latency as possible so that a position of the images is as close as possible to a current position (e.g., a head position of a head mounted display (HMD)) of a user viewing the image.

Thus, there is a need in the art for improvements in compositing VR images for presentation on a display.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a memory to store data and instructions, a processor in communication with the memory, an operating system in communication with the memory and processor. The operating system may be operable to receive at least a first surface from a first image source and a second surface from a second image source, generate a composite image with a combined first surface and second surface by contemporaneously applying position corrections to the first surface and the second surface and lens distortion corrections to the first surface and the second surface and blending the first surface and the second surface into respective positions in the composite image, and transmit the composite image representing a virtual environment for presentation to a downstream consumer.

Another example implementation relates to a method for performing one step compositing. The method may include receiving, at an operating system executing on a computer device, at least a first surface from a first image source and a second surface from a second image source. The method may also include generating, at the operating system, a composite image with a combined first surface and second surface by contemporaneously applying position corrections to the first surface and the second surface and lens distortion corrections to the first surface and the second surface and blending the first surface and the second surface into respective positions in the composite image. In addition, the method may include transmitting the composite image representing a virtual environment for presentation to a downstream consumer.

Another example implementation relates to computer-readable medium storing instructions executable by a computer device. The computer-readable medium may include at least one instruction for causing the computer device to receive at least a first surface from a first image source and a second surface from a second image source. The computer-readable medium may include at least one instruction for causing the computer device to generate a composite image with a combined first surface and second surface by contemporaneously applying position corrections to the first surface and the second surface and lens distortion corrections to the first surface and the second surface and blending the first surface and the second surface into respective positions in the composite image. The computer-readable medium may include at least one instruction for causing the computer device to transmit the composite image representing a virtual environment for presentation to a downstream consumer.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods of one step compositing and lens distortion correction of virtual reality image frames from different sources into a composite virtual environment frame. As used herein, the term virtual reality (VR) relates to any at least partially virtual environment, and may include mixed reality (MR) (e.g., combining of at least two virtual environments) and augmented reality (AR) (e.g., combining of a real world environment with at least one virtual environment). In some implementations, the one step compositing also includes taking into account different head positions in the original image frames from the different sources.

The devices and methods may perform virtual reality image compositing in one step by blending together various image corrections at the same time to generate a composite image. The devices and methods may correlate final pixel positions in the final virtual environment of surfaces to original pixel positions in the original virtual environments of the surfaces, and may perform one time sampling and image correction (e.g., lens distortion, late latching of head position) of the original source pixels to generate the composite image in the final virtual environment.

For example, the devices and methods may combine two or more 3D virtual or mixed world images into a composite image in a final virtual environment. In this case, an original coordinate system and/or head position of the original images may be aligned. Combining two or more 3D virtual or mixed world images into a composite image may be referred to as mixed source compositing.

Also, for example, the devices and methods may apply to combining two or more 2D virtual or mixed world images onto a 2D surface within a 3D image in the final virtual environment. In this case, this solution may involve accounting for distortion caused by ray casting of different colored rays (e.g., red, green, blue) associated with each pixel of each surface. Combining two or more 2D virtual or mixed world images onto a 2D surface within a 3D image may be referred to as virtual theater compositing. The two or more 2D images may be from different processes. For example, one 2D image may be from a game that may represent a 3D world while another 2D image may be from a user interface separate from the game. The 2D images may be combined onto a virtual television in the final virtual environment.

Figure 1:
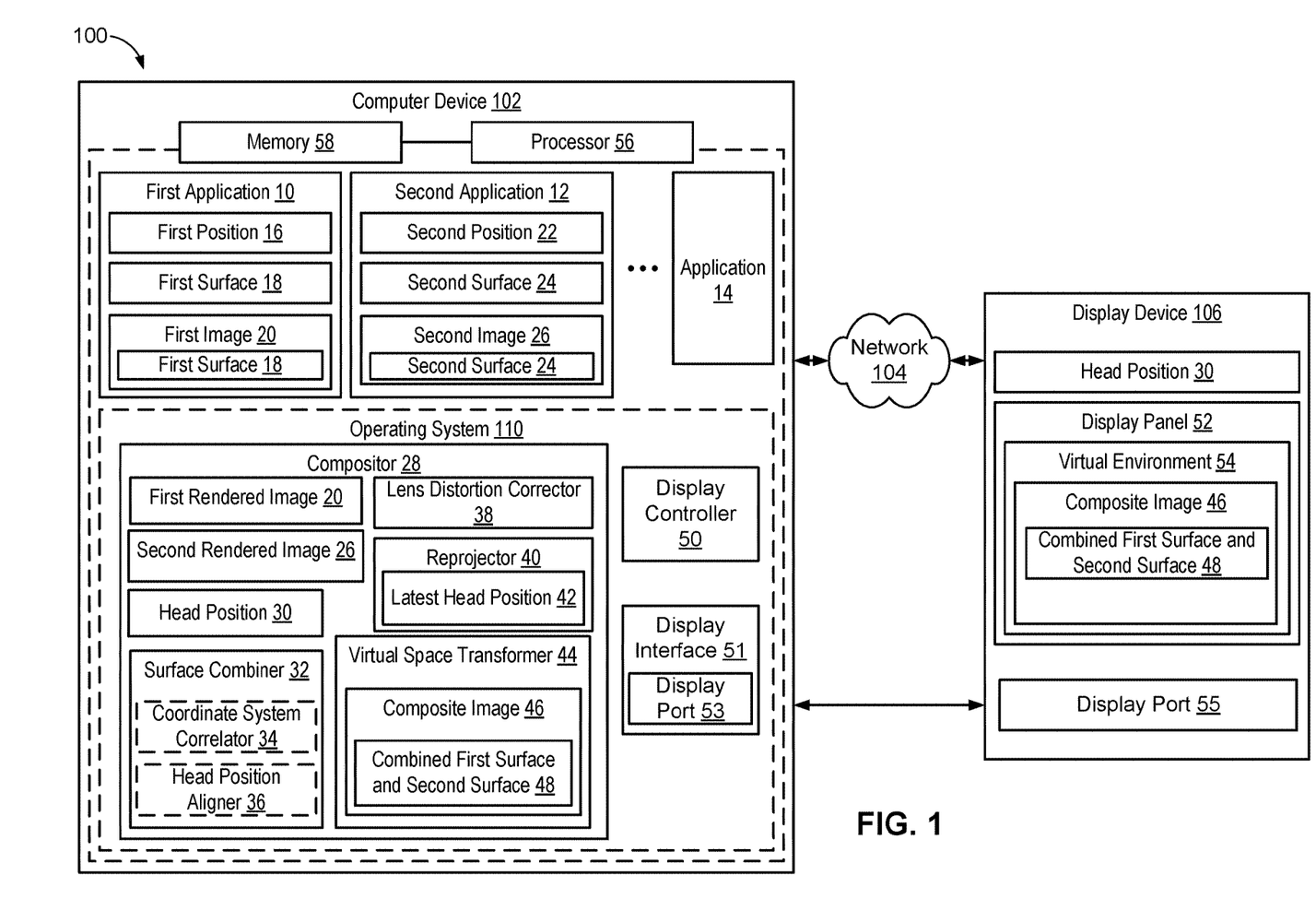
FIG. 1 is a schematic block diagram of an example computer device for use with one step virtual image compositing in accordance with an implementation of the present disclosure.

Referring now to FIG. 1, an example system 100 for use in connection with performing virtual reality image compositing in one step may include a computer device 102 in communication with one or more display devices 106. Computer device 102 may communicate image data for displaying VR images on display device 106. Display device 106 may include, for example, a head mounted display (HMD).

Computer device 102 may include an operating system 110 executed by processor 56 and/or memory 58 of computer device 102. Memory 58 of computer device 102 may be configured for storing data and/or computer-executable instructions defining and/or associated with operating system 110, and processor 56 may execute operating system 110. An example of memory 58 can include, but is not limited to, a type of memory usable by a computer, such as random access memory (RAM), read only memory (ROM), tapes, magnetic discs, optical discs, volatile memory, non-volatile memory, and any combination thereof. An example of processor 56 can include, but is not limited to, any processor specially programmed as described herein, including a controller, microcontroller, application specific integrated circuit (ASIC), field programmable gate array (FPGA), system on chip (SoC), or other programmable logic or state machine.

Computer device 102 may include any mobile or fixed computer device, which may be connectable to a network. Computer device 102 may be, for example, a computer device such as a desktop or laptop or tablet computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices and/or communication networks.

Computer device 102 may include a plurality of applications, such as first application 10, second application 12, and up to n applications 14 (where n is a positive number), that may be executed by processor 56 to present one or more virtual reality images on display device 106. The one or more applications 10, 12, 14 may include, for example, different VR applications (e.g., including MR and/or AR applications) that may generate a virtual environment 54. In addition, the one or more applications 10, 12, 14 may provide content for virtual environment 54. For example, the first application 10 may provide a virtual game for the virtual environment 54, while the second application 10 may provide various content that may be used and/or viewed within the virtual environment 54. For example, the second application 10 may provide notifications that are presented within virtual environment 54. Another example may include the second application 10 providing an object that may be used within virtual environment 54.

The first application 10 may provide a first surface 18 for a first image 20. The first surface 18 may be at a first position 16. The first position 16 may be a position within the first image 20 relative to, for example, a first coordinate system of the first image 20. In an implementation, the first position 16 may also correspond to a head position 30 of a user wearing a display device 106, such as a HMD. The head position 30 of a user may be determined from head motion input received from HMD tracking information (e.g., a position and/or orientation of the HMD 106).

The second application 12 may also provide a second surface 24 for a second image 26. The second surface 24 may be a second position 22 relative to, for example, a second coordinate system of a second image 26. The second position 22 may also correspond to a head position 30 of a user wearing a display device 106, such as a HMD. The second coordinate system may be different from the first coordinate system, or they may be the same coordinate system. The first application 10 and the second application 12 may sample head position 30 at different times. As such, the first surface 18 and the second surface 24 may correspond to different initial head positions.

The first application 10 may render a first image 20 with the first surface 18 based on the first position 16. In addition, the second application 12 may render a second image 26 with a second surface 24 based on the second position 22. In an implementation, the first position 16 and the second position 22 may be at the same position (e.g., in virtual theater compositing). In addition, the first application 10 and the second application 12 may render the first image 20 and the second image 26 at the same time as one another and/or at different times. As such, compositing in one step may be necessary in order to reconcile the two different head positions into a common coordinate space and time (e.g., the coordinate space of the final virtual environment and the precise time that the user may be shown the image). Without correcting for the difference in the head positions, the first image 20 and the second image 26 may appear to diverge or move relative to one another in incorrect ways.

Operating system 110 may include a compositor 28 operable to receive n surfaces from n image sources (where n is a positive number). The different image sources may be, for example, different VR applications. For example, computer device 102 may have a plurality of different image sources, such as, first application 10, second application 10, and up to n applications 14 that provide a plurality of image surfaces (e.g., first surface 18 and second surface 24) to include in a rendered virtual reality image. The first application 10 and the second application 12 may be operating independently of one another. For example, the first application 10 may be a MR game that has exclusive control of the virtual environment 54 and the second application 12 may be operating independently and may provide various notifications to a user. In addition, the different image sources may provide images in various dimensions. For example, the first application 10 may provide a three dimensional (3D) first image 20 and the second application 12 may provide a two dimensional (2D) second image 26.

In addition, each of the image surfaces (e.g., first surface 18 and second surface 24) may correspond to a different positions (e.g., first position 16 and second position 22) and may move independently and/or in the same direction. For example, first surface 18 may correspond to a virtual dog moving in one direction, while second surface 24 may correspond to a virtual cat moving in a different direction. In some cases, such as the mixed source compositing case, each of the image surfaces may correspond to different initial head positions (e.g., different positions of an HMD device such as display device 106). For example, first position 16 and second position 22 may correspond to different head positions 30. In other cases, such as the virtual theater compositing case, the image surfaces (e.g., first surface 18 and second surface 24) may correspond to a same initial head position 30. Display device 106 may capture and communicate a head position 30 of a user wearing display device 106 to computer device 102. The head position 30 of a user may be determined from head motion input received from HMD tracking information (e.g., a position and/or orientation of the HMD 106).

Compositor 28 may also include a surface combiner 32 to apply position corrections, such as to blend the different surfaces (e.g., first surface 18 and second surface 24) into respective positions in the final virtual environment 54. Surface combiner 32 may include a coordinate system correlator 34 that translates the first surface 18 and/or the second surface 24 into a common coordinate system. For example, the first rendered image 20 may be in a different coordinate system relative to the second rendered image 26. In addition, surface combiner 32 may include a head position aligner 36 that extrapolates the first rendered image 20 and/or the second rendered image 26 to a common head position. Another example may include the first surface 19 and the second surface 24 corresponding to different initial head positions. Surface combiner 32 may use coordinate system correlator 34 and head position aligner 36 to transform the first rendered image 20 and the second rendered image 26 into respective images with a common coordinate systems and the same head position. The surface combiner 32 may project the combined first surface and second surface into the final virtual environment 54.

In addition, compositor 28 may include a lens distortion corrector 38 to apply lens distortion corrections, such as to account for barrel distortion and chromatic aberration in the projection of the original surfaces (e.g., first surface 18 and second surface 24) into the composite image 46 in the final virtual environment 54. In addition, lens distortion corrector 38 may perform passive or active transformations to correct for other possible lens distortions. Compositor 28 may take into account a variety of lens distortion corrections to ensure the output image transforms correctly for display on display device 106.

Figure 2:
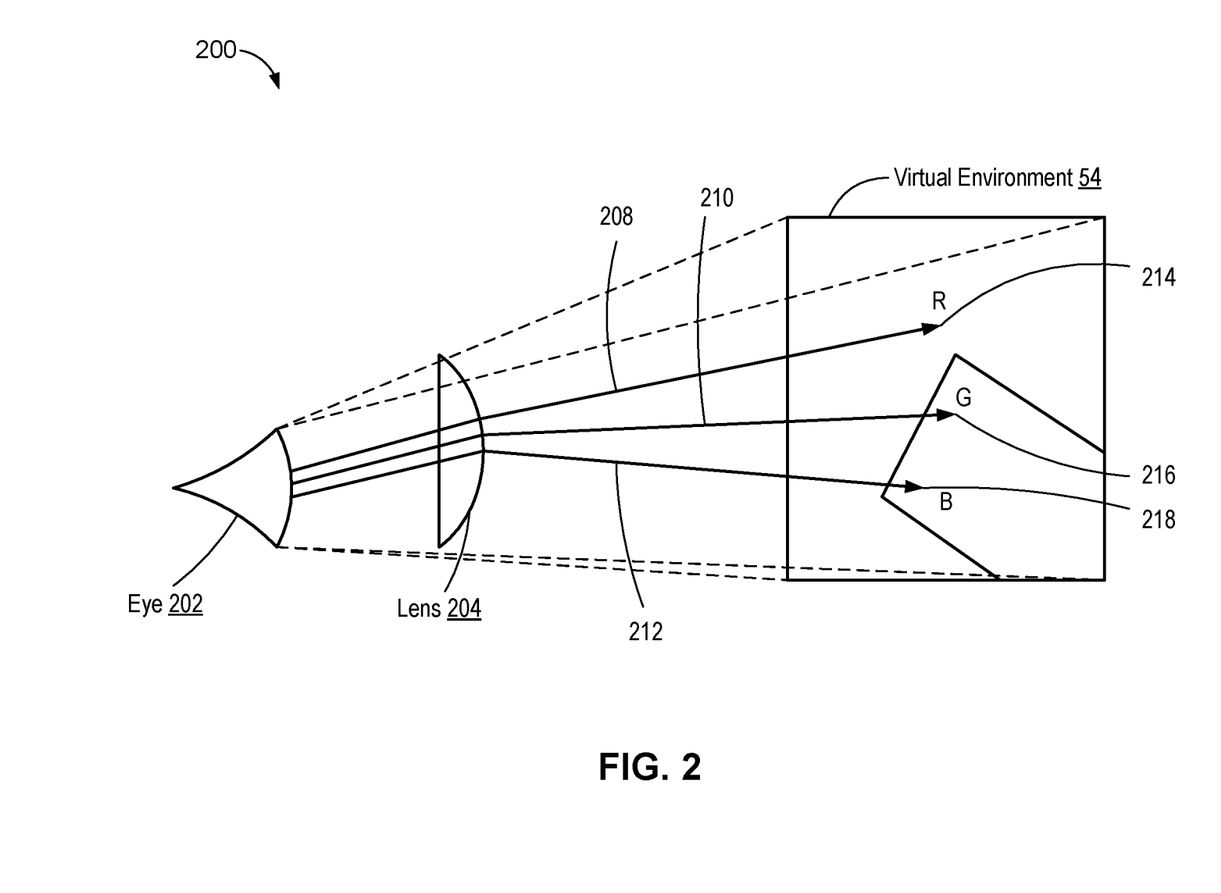
FIG. 2 is a schematic diagram of an example of lens distortion in accordance with an implementation of the present disclosure.

Referring now to FIG. 2, illustrated is an example diagram 200 of lens distortion that may occur when light passes through a lens 204 of a display device from the viewpoint of a user 202 in accordance with an implementation. The first rendered image 20 (FIG. 1) and/or the second rendered image 26 (FIG. 1) may be in color. When the red light ray 208, green light ray 212, and blue light ray 212 of the first rendered image 20 and/or the second rendered image 26 pass through the lens 204 some distortion may occur, such as barrel distortion and chromatic aberration. As such, the red light ray 208 may end at position 214 in the virtual environment 54, the green light ray 210 may end at position 216 in the virtual environment 54, and the blue light ray 212 may end at position 218 in the virtual environment 54.

Lens distortion corrector 38 (FIG. 1) may apply one or more lens distortion corrections to account for any barrel distortion and/or chromatic aberration when the first rendered image 20 and/or the second rendered image 26 is/are projected through a lens of the display device 106. For example, lens distortion corrector 38 may work backward from the end positions 214, 216, and 218 of the red light ray 208, the green light ray 210, and the blue light ray 212 to a single position to correct for any distortion that may occurred through the lens 204.

Referring back to FIG. 1, compositor 28 may also include a reprojector 40 to apply a latest change in position to composite image 46, such as to extrapolate the combined and lens distortion corrected image to an updated position. For example, the updated position may be based on a latest head position 42 when the head position 30 of a user changes.

Compositor 28 may include a virtual space transformer 44 that operates in conjunction with each of the surface combiner 32, the lens distortion corrector 38, and the reprojector 40 to enable them to work contemporaneously to apply their respective corrections to the original surfaces (e.g., first surface 18 and second surface 24) directly into the composite image 46 to be presented in the final virtual environment 54. For example, compositor 28 may receive information of n surfaces, such as, but not limited to, n positions, n coordinate spaces, n head positions, as well as the lens distortion characteristics (e.g., barrel distortion and chromatic aberration) for display device 106. Compositor 28 may use the received information to correct the image coordinate spaces, reproject the images into the future, blend the images, and use the lens characteristics to distort the images so that the images appear correct to the user with minimal accesses to the source images enabling maximum performance. As such, the first surface 18 and second surface 24 may be blended into respective positions in the composite image 46 in one step.

In an implementation, compositor 28 may be or may include a single GPU shader that performs the one step compositing of the first surface 18 and the second surface 24 and lens distortion correction in a quick and resource efficient manner to generate the composite image 46. By providing information of the n surfaces, n positions, n coordinate spaces, n head positions, as well as the lens distortion characteristics (e.g., barrel distortion and/or chromatic aberration) to the shader, the shader may have sufficient information to correct the image coordinate spaces, reproject the images into the future, composite the images, and use the lens characteristics to distort the images so that the images appear correct to the user while only using one shader and minimal accesses to the source images enabling maximum performance. For example, the shader may produces a GPU packet workload that may be submitted to a GPU. The GPU may receive the packets and/or payload from the shader of work to execute the shader operating on the input data (e.g., n surfaces, n coordinate spaces, n head positions, and lens distortion characteristics). By using a single shader, one shader payload may be provided to the GPU. With more than one shader, the plurality of shaders may access the n surfaces more times than a single shader accesses the n surfaces and may incur more writes into intermediate surfaces. In addition, with more than one shader, a plurality of shader payloads may be produced. As such, the memory required when using a single shader for compositor 28 may be reduced.

In another implementation, the one step compositing performed by compositor 28 may be implemented in hardware. For example, the one step compositing rules may be programmed into a field-programmable gate array (FPGA). Another example may include creating a standalone integrated circuit to perform the one step compositing. In addition, the one step compositing may be included as an addition to an existing integrated circuit design.

Compositor 28 may determine when to transmit the composite image 46 for presentation to one or more downstream consumers. Downstream consumers may include, but are not limited to, display device 106, a network device, a video stream (e.g., a game digital video recorder (DVR)), and a headset. Compositor 28 may communicate with display controller 50 to transmit the composite image 46 for presentation on the downstream consumers. In an implementation, display controller 50 may communicate with a display interface 51 that may be communicatively coupled with the processor 56 and/or memory 58 for communicating with the display device 106 via a display ports 53 and 55. Display ports 53 and 55 may include various types of ports including, but not limited to, high definition multimedia interface (HDMI) ports, display serial interface (DSI) ports, mobile industry processor interface (MIPI) DSI ports, universal serial bus (USB) ports, Firewire ports, or other embedded or external wired or wireless display ports that can allow communications, for example, via network 104 between computer device 102 and display device 106.

Display device 106 may include a display panel 52 that presents virtual environment 54. The virtual environment 54 may include the composite image 46 with the combined first surface and second surface 48.

By performing a one-step compositing process, compositor 28 may reduce an amount of rendering and texture sampling required to generate the composite image 46. As such, operation of computer device 102 incorporating compositor 28 for one step compositing and lens distortion correction of virtual reality image frames from different sources operates in a quick and resource efficient manner to generate a composite virtual environment image frame.

Figure 3:
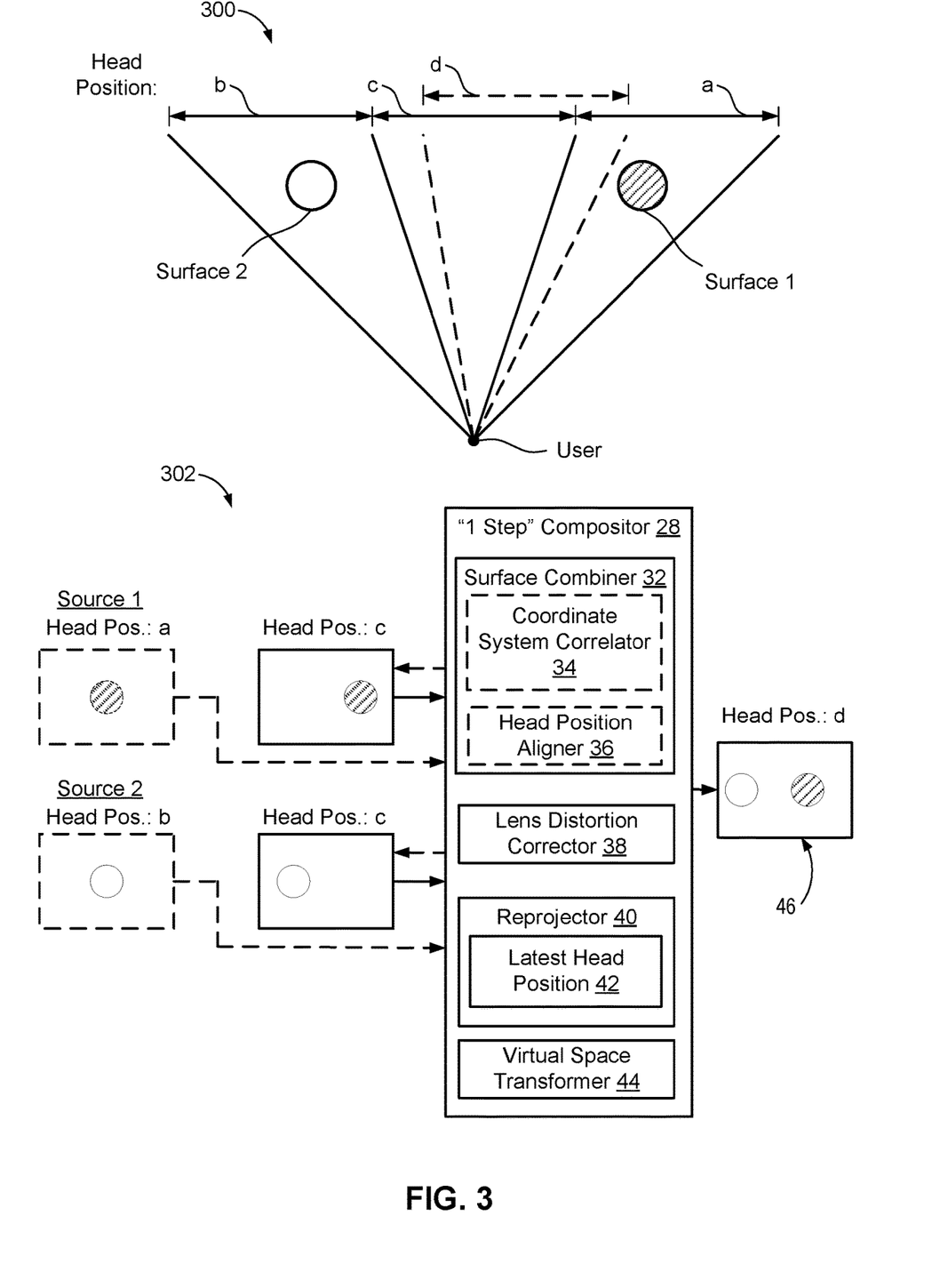
FIG. 3 is a graph of head positions relative to surfaces and a corresponding schematic block diagram of an example of processing of different source images by compositor in accordance with an implementation of the present disclosure.

Referring now to FIG. 3, an example graph 300 of head positions of a user relative to surfaces, e.g., Surface 1 and Surface 2, and a corresponding schematic block diagram 302 of an example of processing of the different source images by compositor 28 provides an example of performing virtual reality image compositing in one step, as described herein. Although this example involves two source surfaces and two image sources, it should be understood that compositor 28 may receive n surfaces from m image sources, where n and m are positive numbers that may or may not be the same. For example, compositor 28 may receive the solid circle, e.g., Surface 2, and the cross-hatched circle, e.g., Surface 1, from Source 2 and Source 1, respectively. The different image sources may be, for example, different VR applications.

In some cases, such as the mixed source compositing case, each of the surfaces (e.g., the solid circle and the cross-hatched circle) may correspond to different initial head positions (e.g. position a and position b, respectively). In other cases, such as the virtual theater compositing case, both of the surfaces (e.g., the solid circle and the cross-hatched circle) may be rendered using a screen position and a head position (e.g. position c) may be used to transform, composite, and distort the rendered surfaces into a 3D virtual world (e.g., the virtual theater).

Compositor 28 may have surface combiner 32 that applies position corrections, such as to blend the different surfaces into respective positions in the final virtual environment. When the solid circle and the cross-hatched circle correspond to different initial head positions (e.g. position a and position b, respectively), surface combiner 32 may use coordinate system correlator 34 and head position aligner 36 to transform the solid circle and the cross-hatched circle into a respective image with a common coordinate systems and the same head position (e.g., position d).

In addition, compositor 28 may have lens distortion corrector 38 that applies lens distortion corrections, such as to account for barrel distortion and chromatic aberration in the projection of the original surfaces into the composite image in the final virtual environment.

Compositor 28 may also have a reprojector 40 to apply the latest change in position, such as to extrapolate the combined and lens distortion corrected image to an updated position based on a latest head position 42. For example, if a user has a current head position 42 corresponding to a position c, reprojector 40 may update the position corresponding to the cross-hatched circle to position c and may also update the position corresponding to the solid circle to position c.

A virtual space transformer 44 that operates in conjunction with each of the surface combiner 32, the lens distortion corrector 38, and the reprojector 40 may enable contemporaneous work to apply respective corrections to the original surfaces (e.g., the solid circle and the cross-hatched circle) directly into the composite image 46 to be presented in the final virtual environment.

Based on the above-described combined and concurrent operations, compositor 28 generates the composite image 46 of a plurality of different source surfaces (e.g., the solid circle and the cross-hatched circle) in one step into the final virtual environment (e.g., the image of the surfaces at head position d).

Figure 4:
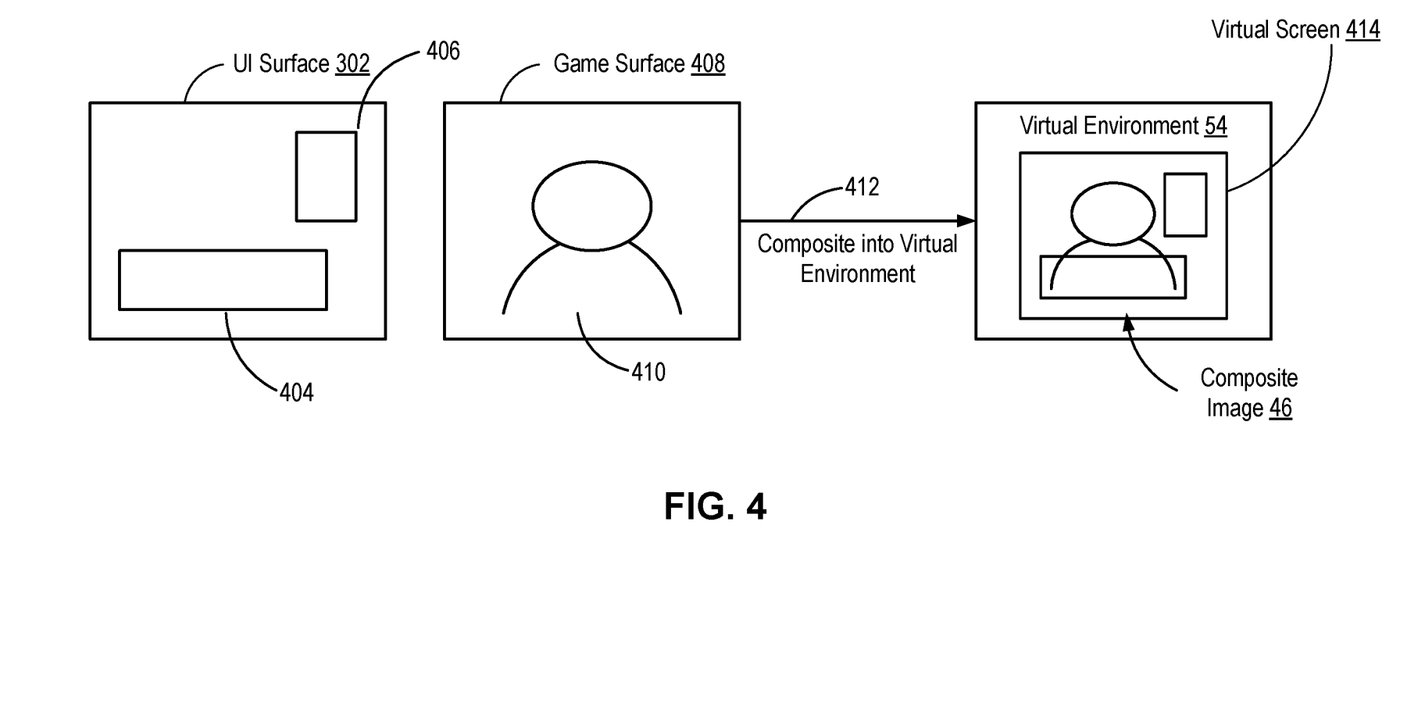
FIG. 4 is a schematic diagram of an example of a composite image in accordance with an implementation of the present disclosure.

Referring now to FIG. 4, illustrated is an example composite image 46 presented on a virtual screen 414 within in virtual environment 54. The composite image 46 may combine notifications 404 and 406 from a user interface surface 402 with a character image 410 from a game surface 408. At 412, when compositor 28 combines the notifications 404 and 406 with the character image 410 to create composite image 46, the notifications 404 may overlay the character image 410 in the final composite image 46. The composite image 46 may be projected onto a 2D virtual screen 414 within the virtual environment 54. For example, the virtual screen 414 may be a television screen within the virtual environment 54.

Figure 5:
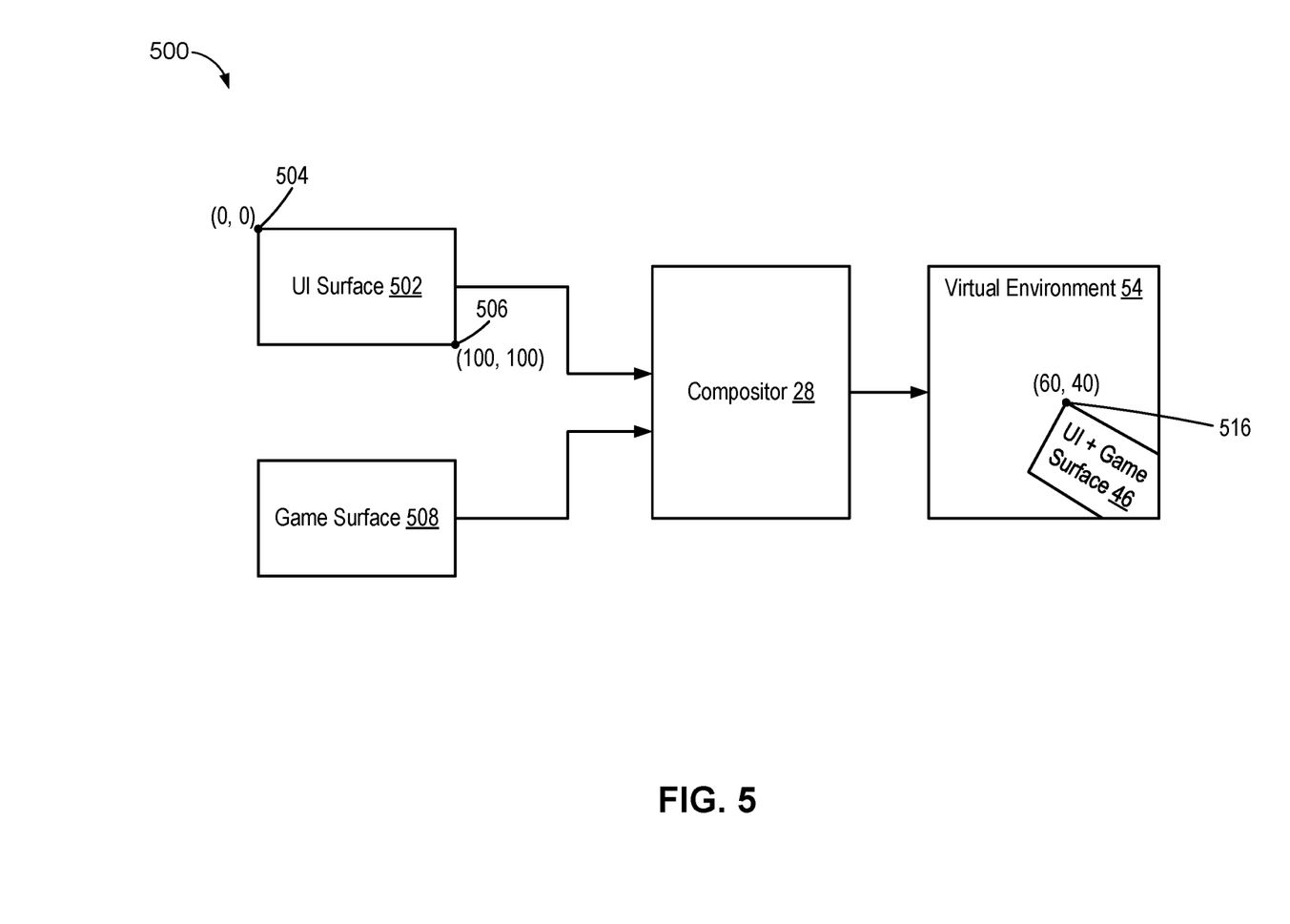
FIG. 5 is a schematic diagram of an example of a compositor generating a composite image in accordance with an implementation of the present disclosure.

Referring now to FIG. 5, illustrated is an example composite image 46 within virtual environment 54. Compositor 28 may receive a user interface surface 502 and a game surface 508 to combine into a single composite image 46 of the game surface on the UI surface. User interface surface 502 may include, for example, a rectangular shape defined by a first corner position 504 with coordinates (0,0) and a second corner position 506 diagonal to origin position 504, where second corner position 506 has coordinates (100, 100). Compositor 28 may work backwards from each pixel in the final virtual environment, e.g., virtual environment 54, by correlating the final pixel positions in the final virtual environment 54 of the surfaces (e.g., user interface surface 502 and game surface 508) to original pixel positions in the original virtual environments of the surfaces. In this example, for instance, the first corner position 504 (having source coordinates of (0, 0)) of the UI surface 502 may map to corner position 516 having coordinates (60, 40) in the final virtual environment 54. Similarly, for instance, the second corner position 504 (having source coordinates of (100, 100)) of the UI surface 502 may map to a position that falls outside of the final virtual environment 54. Compositor 28 may perform a one-time sampling and image correction of the original source pixels (e.g., origin position 504) to generate the composite image 46 in the final virtual environment 54. The one-time sampling and image correction may include lens distortion correction and late latching of head position, and optionally (e.g., in the mixed source compositing case) reconciling of different source coordinate systems and/or head positions, as illustrated in FIG. 6.

Figure 6:
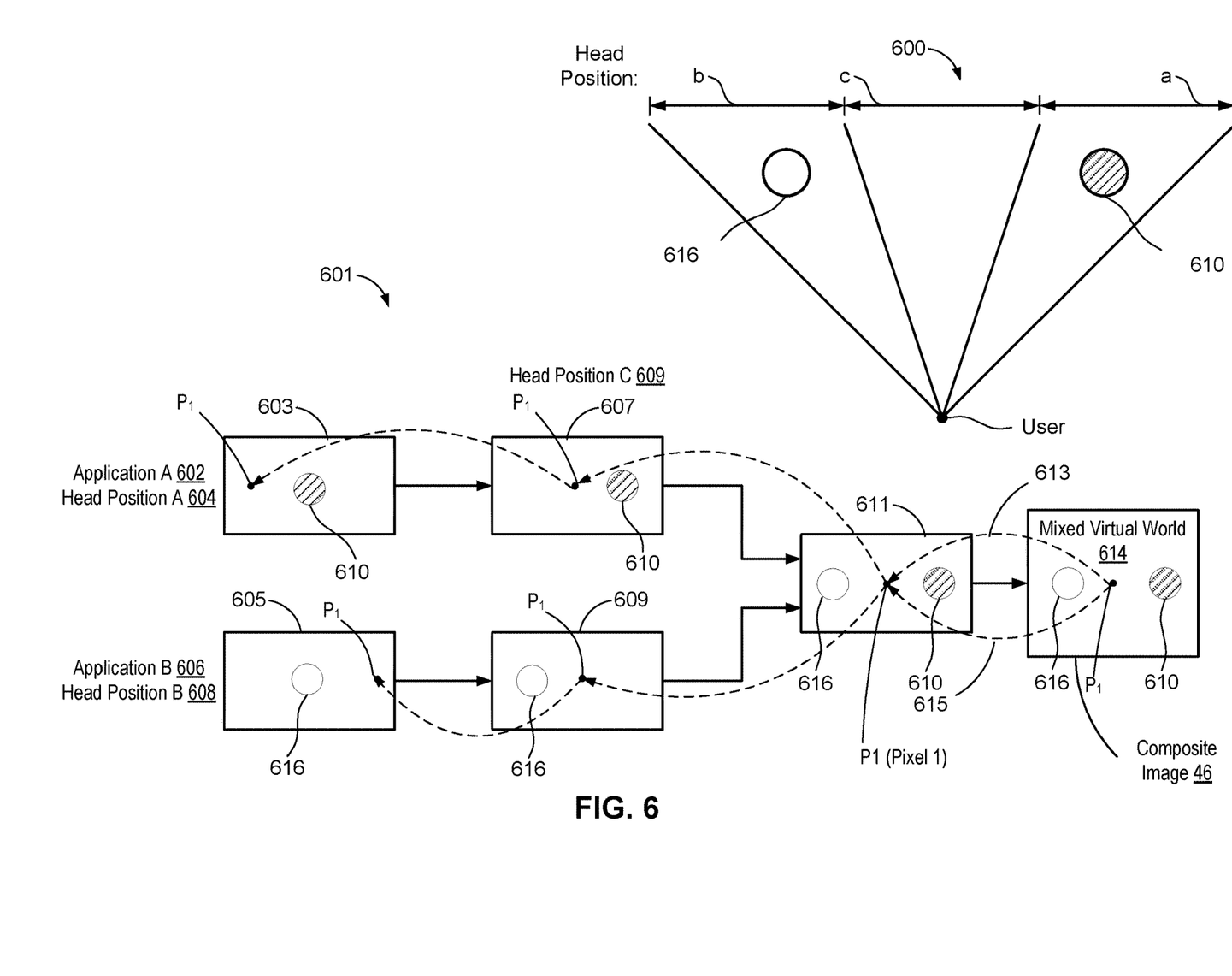
FIG. 6 is a graph of head positions relative to surfaces and a corresponding schematic block diagram of an example of processing of different source images by compositor, including applying position corrections from different sources to a composite image, in accordance with an implementation of the present disclosure.

Referring now to FIG. 6, illustrated is an example of a graph 600 of head positions of a user relative to different surfaces 610, 616 and a corresponding schematic block diagram 601 of an example of processing of the different source images 603, 605 by compositor 28, including applying position corrections from the different sources to composite image 46 of mixed virtual world 614, in accordance with an implementation. Application A 602 may render a first surface 610 at a head position A 604 in first source image 603. In addition, application B may render a second surface 616 at a head position B 608 in second source image 603. Before compositor 28 combines the first surface 610 and the second surface 616 into composite image 46 in mixed virtual world 614, the head position of the user moves to a new head position 612, e.g., head position C, as represented by source images 607 and 609, respectively. It should be noted that compositor 28 may not receive source images 607 and 609, but is able to determine information corresponding to images 607 and 609 based on receiving first source image 603, second source image 605, and the new head position 612.

In some implementations, such as in a virtual theater case, prior to compositing the different source images, compositor 28 may translate the first surface 610 and/or the second surface 616 into a common coordinate system. For example, the first surface 610 may be in a different coordinate system relative to the second surface 616. In addition, compositor 28 may extrapolate the head position A 604 of the first source image 603 and/or the head position B of the second source image 605 to a common head position. As such, compositor 28 may transform the first source image 603 and/or the second source image 605 into respective images 607 and 609 with a common coordinate systems and the same head position.

In performing its one-step operation, compositor 28 (FIG. 1) may work backwards from each pixel in the final virtual environment to a corresponding pixel in the source virtual environments, as illustrated by the dashed lines 613 and 615. In other words, compositor 28 may correlate the final pixel positions (e.g., $P_1$) in the final virtual environment (e.g., mixed virtual world 614) to corresponding pixel positions in the original virtual environments (e.g., the environment of first source image 603 of application A 602 and the environment of second source image 605 of application B 606), and may perform a one-time sampling and image correction of the original source pixels to generate the composite image 46 in the final mixed virtual world 614. The one-time sampling and image correction includes lens distortion correction and late latching of head position (e.g., head position C 609), and reconciling of different source coordinate systems and/or head positions (e.g., head position A 604 and/or head position B 608). As such, compositor 28 may translate $P_1$ back to the corresponding coordinates in the original Application A 602 image and the original Application B 606 image to obtain texture information for the corresponding pixel $P_1$ in the composite image 46.

That is, compositor 28 may perform n position calculations (where n is a positive number) along with at least one distortion calculation in one step. Each position in the virtual space corresponding to a real display pixel may be worked back into various spaces using compositor 28. Example spaces include, but are not limited to, a physical display space, an undistorted virtual environment space, a distorted virtual environment space, a head position 1 space, a head position 2 space, and a head position current space. For example, the n position calculations performed by compositor 28 are the pixel positions in the composited image 611, while the single distortion calculation includes lens distortion correction and transformation from the coordinates of the virtual environment of the composited image 611 to the coordinates of the mixed virtual world 614 of composite image 46. In addition, the distortion calculation performed by compositor 28 may include a single calculation or a plurality of calculations. For example, adaptive lenses, or other mechanisms, may require multiple calculations that account for different distortions at different stages. In other words, there may be multiple other spaces that may be traversed during the one step compositing performed by compositor 28. In an implementation, compositor 28 may be a single shader and the space conversion calculations and inverse distortion calculations may occur in the single shader without the need of storing images encoded in those intermediate spaces, and subsequently, needing to access and/or sample those surfaces. The single step compositor 28 may bypass storing images encoding in the intermediate spaces and accessing and/or sampling the intermediate surfaces by receiving the information describing how each surface transforms from space to space. Thus, the amount of accesses required to the intermediate surfaces may be reduced, memory savings may be provided, texture sampling may be reduced, and cache utilization may be improved.

By knowing where to sample from in the original images and accounting for the latest location of the head position, compositor 28 may perform one step compositing and lens distortion correction of virtual reality image frames from different sources operates in a quick and resource efficient manner to generate a composite virtual environment frame.

Figure 7:
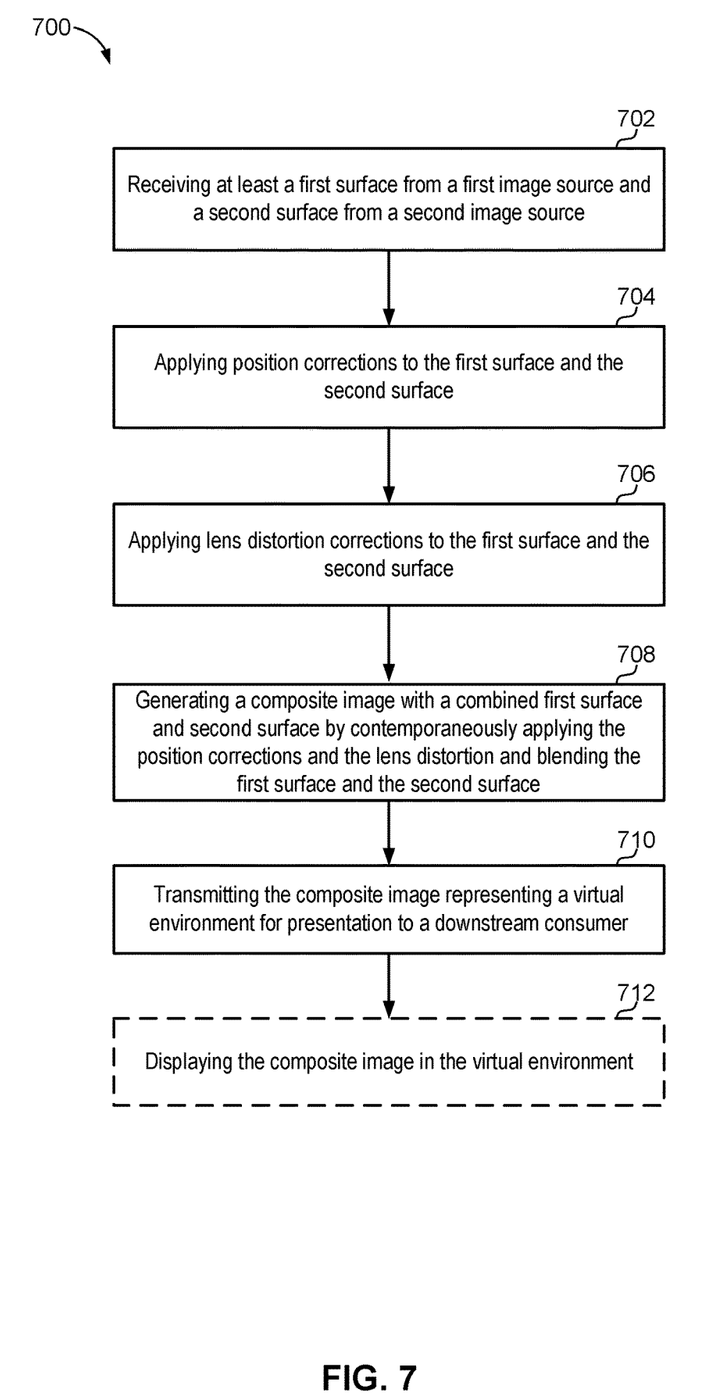
FIG. 7 is a flowchart of an example method for performing one step image compositing in accordance with an implementation of the present disclosure.

Referring now to FIG. 7, illustrated is a method 700 that may be used by computer device 102 (FIG. 1) to generate a composite image 46 (FIG. 1) using compositor 28 (FIG. 1). Compositor 28 may perform one step compositing and lens distortion correction of virtual reality or mixed reality image frames from different image sources into the composite image 46.

At 702, method 700 may include receiving at least a first surface from a first image source and a second surface from a second image source. Compositor 28 (FIG. 1) may receive n surfaces from n image sources (where n is a positive number). For example, compositor 28 may receive first surface 18 from first application 10 and may receive second surface 24 from second application 12. The first application 10 may render a first image 20 with the first surface 18 and the second application 12 may render second image 26 with the second surface 24. Compositor 28 may receive the first image 20 and the second image 26 from the first application 10 and second application 12, respectively.

The different image sources may be, for example, different VR applications. As such, the first application 10 and the second application 12 may be operating independently of one another. For example, the first application 10 may be a MR game that has exclusive control of the virtual environment 54 and the second application 12 may provide various notifications to a user. In addition, compositor 28 may receive images in various dimensions. For example, the first application 10 may provide three dimensional (3D) first image 20 and the second application 12 may provide two dimensional (2D) second image 26.

At 704, method 700 may include applying position corrections to the first surface and the second surface. Compositor 28 may also include surface combiner 32 to apply position corrections, such as to blend the different surfaces (e.g., first surface 18 and second surface 24) into respective positions in the final virtual environment 54 and/or to correct from individually supplied coordinates (e.g., old predicted head positions from the first surface 18 and the second surface 24) to a new forward predicted coordinate (e.g., a new predicted head position). Surface combiner 32 may include coordinate system correlator 34 that translates the first surface 18 and/or the second surface 24 into a common coordinate system. For example, the first rendered image 20 may be in a different coordinate system relative to the second rendered image 26. In addition, surface combiner 32 may include head position aligner 36 that extrapolates the first rendered image 20 and/or the second rendered image 26 to a common head position. Another example may include the first surface 18 and the second surface 24 corresponding to different initial head positions. The first application 10 and the second application 12 may sample head position 30 at different times. As such, the first surface 18 and the second surface 24 may correspond to different initial head positions. Surface combiner 32 may use coordinate system correlator 34 and head position aligner 36 to transform the first rendered image 20 and the second rendered image 26 into respective images with a common coordinate systems and the same head position.

Compositor 28 may also include reprojector 40 to apply a latest change in position, such as to extrapolate the combined and lens distortion corrected image to an updated position. For example, the updated position may be based on latest head position 42 when the head position 30 of a user changes. While the initial head positions 30 for the first surface 18 and the second surface 24 may correspond to different initial head positions, the latest head position 42 may correspond to a common head position for the first surface 18 and the second surface 24. The surface combiner 32 may project the combined first surface and second surface into the final virtual environment 54.

At 706, method 700 include applying lens distortion corrections to the first surface and the second surface. Compositor 28 may include lens distortion corrector 38 to apply lens distortion corrections, such as to account for any changes that may occur during the projection of the original surfaces (e.g., first surface 18 and second surface 24) into the composite image 46 in the final virtual environment 54. For example, the one or more lens distortion corrections may account for any barrel distortion and/or chromatic aberration when the first rendered image 20 and/or the second rendered image 26 is projected through a lens of the display device 106. In addition, the one or more lens distortion corrections may correct for other possible lens distortions by using passive or active transformations to ensure the output image transforms correctly for display on display device 106.

At 708, method 700 may include generating a composite image with a combined first surface and second surface by contemporaneously applying the position corrections and the lens distortion and blending the first surface and the second surface. Compositor 28 may include virtual space transformer 44 that operates in conjunction with each of the surface combiner 32, the lens distortion corrector 38, and the reprojector 40 to enable them to work contemporaneously to apply their respective corrections to the original surfaces (e.g., first surface 18 and second surface 24) directly into the composite image 46 to be presented in the final virtual environment 54. In addition, the compositor 28 may blend the first surface 18 and the second surface 24 into respective positions in the composite image 46. For example, one blend may include a naïve flatten on top of one another. In a virtual theater implementation, a blend may include a projection into a virtual 3D space and another projection back onto the 2D physical display to provide the illusion of a virtual TV of arbitrary size. As such, the first surface 18 and second surface 24 may be blended into respective positions in the composite image 46 in one step.

At 710, method 700 may include transmitting a composite image representing a virtual environment for presentation to a downstream consumer. For example, composite image 46 may be a representation of virtual environment 54. Compositor 28 may determine when to transmit the composite image 46 for presentation to one or more downstream consumers. Downstream consumers may include, but is not limited to, display device 106, a video stream, such as a game DVR, a network device, and a headset.

At 712, method 700 may optionally include displaying the composite image in the virtual environment. For example, display device 106 may include a display panel 52 that presents the virtual environment 54 to a user. The virtual environment 54 may include the composite image 46 with the combined first surface and second surface 48. In an implementation, the composite image 46 may be presented onto a 2D surface within a 3D image. For example, the composite image 46 may be a 2D surface projected onto a 2D physical screen in a 3D space (e.g., a television within a 3D scene for a virtual game). As such, the virtual image 46 may have pixels lighting up on the 2D physical display (e.g., pixels on a television within a 3D scene for a virtual game).

As such, operation of a computer device 102 incorporating one step compositing and lens distortion correction of virtual reality or mixed reality image frames from different sources operates in a quick and resource efficient manner to generate a composite virtual environment frame.

Figure 8:
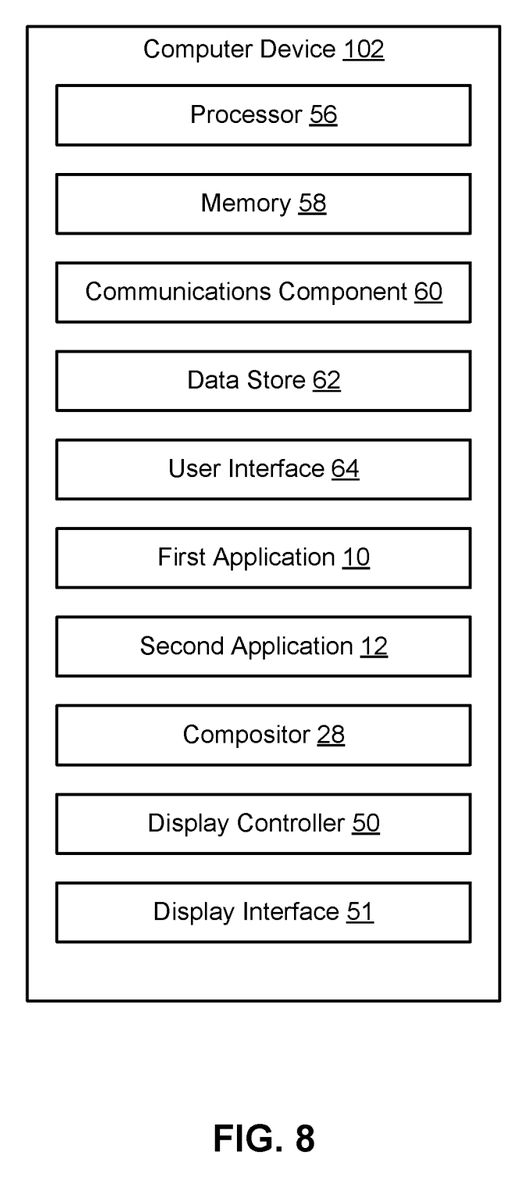
FIG. 8 is a schematic block diagram of an example device in accordance with an implementation of the present disclosure.

Referring now to FIG. 8, illustrated is an example computer device 102 in accordance with an implementation, including additional component details as compared to FIG. 1. In one example, computer device 102 may include processor 56 for carrying out processing functions associated with one or more of components and functions described herein. Processor 56 can include a single or multiple set of processors or multi-core processors. Moreover, processor 56 can be implemented as an integrated processing system and/or a distributed processing system.

Computer device 102 may further include memory 58, such as for storing local versions of applications being executed by processor 56. Memory 58 can include a type of memory usable by a computer, such as random access memory (RAM), read only memory (ROM), tapes, magnetic discs, optical discs, volatile memory, non-volatile memory, and any combination thereof. Additionally, processor 56 and memory 58 may include and execute operating system 110 (FIG. 1).

Further, computer device 102 may include a communications component 60 that provides for establishing and maintaining communications with one or more parties utilizing hardware, software, and services as described herein. Communications component 60 may carry communications between components on computer device 102, as well as between computer device 102 and external devices, such as devices located across a communications network and/or devices serially or locally connected to computer device 102. For example, communications component 60 may include one or more buses, and may further include transmit chain components and receive chain components associated with a transmitter and receiver, respectively, operable for interfacing with external devices.

Additionally, computer device 102 may include a data store 62, which can be any suitable combination of hardware and/or software, that provides for mass storage of information, databases, and programs employed in connection with implementations described herein. For example, data store 62 may be a data repository for first application 10 (FIG. 1), second application 12 (FIG. 1), compositor 28 (FIG. 1), display controller 50 (FIG. 1), and/or display interface 51 (FIG. 1).

Computer device 102 may also include a user interface component 64 operable to receive inputs from a user of computer device 102 and further operable to generate outputs for presentation to the user. User interface component 64 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 64 may include one or more output devices, including but not limited to a display, a speaker, a haptic feedback mechanism, a printer, any other mechanism capable of presenting an output to a user, or any combination thereof.

In an implementation, user interface component 64 may transmit and/or receive messages corresponding to the operation of first application 10, second application 12, compositor 28, display controller 50, and/or display interface 51. In addition, processor 56 executes first application 10, second application 12, compositor 28, display controller 50, and/or display interface 51 and memory 58 or data store 62 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:
1. A computer device, comprising:
a memory to store data and instructions;
a processor in communication with the memory; and
an operating system in communication with the memory and the processor, wherein the operating system is operable to:
receive at least a first surface from a first image source and a second surface from a second image source, wherein the first surface and the second surface have original pixel positions in at least one original virtual environment;
generate a composite image for presentation in a virtual environment with a combined first surface and second surface by projecting the first surface and the second surface into final pixel positions and working backwards from the final pixel positions to contemporaneously apply position corrections and lens distortion corrections to the first surface and the second surface directly into the composite image while blending the first surface and the second surface into respective final pixel positions in the composite image by transforming coordinates of the original pixel positions of the first surface and the second surface in the at least one original virtual environment to coordinates of the final pixel positions in the virtual environment, wherein the position corrections and the lens distortion corrections occur in a single graphics processing unit (GPU) shader without storing images in intermediate spaces; and
transmit, to a downstream consumer, the composite image for presentation in the virtual environment.

2. The computer device of claim 1, wherein the operating system is further operable to:
receive a latest change in position for the first surface and the second surface; and
apply the latest change in position to the first surface and the second surface,
wherein the composite image is generated by contemporaneously applying the position corrections, the lens distortion corrections, and the latest change in position to the first surface and the second surface.

3. The computer device of claim 1, wherein to apply the position corrections to the first surface and the second surface the operating system is further operable to translate the first surface and the second surface into a common coordinate system.

4. The computer device of claim 1, wherein the operating system is further operable to:
receive a first position for the first surface corresponding to a first head position of a user; and
receive a second position for the second surface corresponding to a second head position of the user;
wherein to apply the position corrections to the first surface and the second surface the operating system is further operable to translate the first head position and the second head position to a same head position.

5. The computer device of claim 1, wherein the lens distortion corrections account for changes of the first surface and the second surface when projected through a lens of a display device.

6. The computer device of claim 1, wherein the first image source is from a virtual reality application, mixed reality application, or augmented reality application.

7. The computer device of claim 1, wherein the second image source is from a virtual reality application, mixed reality application, or augmented reality application.

8. The computer device of claim 1, wherein the composite image is presented on a two dimensional physical display in the virtual environment.

9. The computer device of claim 1, wherein the operating system is operable to generate the composite image and contemporaneously apply the position corrections the lens distortion corrections to the first surface and the second surface in one step.

10. The computer device of claim 1, wherein the composite image is displayed to a user.

11. The computer device of claim 1, wherein the virtual environment is a mixed virtual world.

12. The computer device of claim 1, wherein the operating system is further configured to:
receive a first position for the first surface corresponding to a first head position of a user;
receive a second position for the second surface corresponding to a second head position of the user;
receive a new head position of the user;
wherein transforming coordinates of the original source pixel positions of the first surface and the second surface in the at least one original virtual environment to coordinates of the final pixel positions in the virtual environment further includes reconciling the first head position of the user, the second head position of the user, and the new head position of the user into a common coordinate space and time.

13. The computer device of claim 1, wherein transforming coordinates of the original source pixel positions of the first surface and the second surface in the at least one original virtual environment to coordinates of the final pixel positions in the virtual environment further includes reconciling late latching of a head position of a user wearing a head mounted display (HMD).

14. A method for performing one step compositing, comprising:
receiving, at an operating system executing on a computer device, at least a first surface from a first image source and a second surface from a second image source, wherein the first surface and the second surface have original pixel positions in at least one original virtual environment;
generating, at the operating system, a composite image for presentation in a virtual environment with a combined first surface and second surface by projecting the first surface and the second surface into final pixel positions and working backwards from the final pixel positions to contemporaneously apply position corrections and lens distortion corrections to the first surface and the second surface directly into the composite image while blending the first surface and the second surface into respective final pixel positions in the composite image by transforming coordinates of the original pixel positions of the first surface and the second surface in the at least one original virtual environment to coordinates of the final pixel positions in the virtual environment, wherein the position corrections and the lens distortion corrections occur in a single graphics processing unit (GPU) shader without storing images in intermediate spaces; and
transmitting, to a downstream consumer, the composite image for presentation in the virtual environment.

15. The method of claim 14, further comprising:
receiving a latest change in position for the first surface and the second surface; and
applying the latest change in position to the first surface and the second surface,
wherein the composite image is generated by contemporaneously applying the position corrections, the lens distortion corrections, and the latest change in position to the first surface and the second surface.

16. The method of claim 14, wherein to apply the position corrections to the first surface and the second surface further includes translating the first surface and the second surface into a common coordinate system.

17. The method of claim 14, further comprising:
receiving a first position for the first surface corresponding to a first head position of a user; and
receiving a second position for the second surface corresponding to a second head position of the user,
wherein to apply the position corrections to the first surface and the second surface further includes translating the first head position and the second head position to a same head position.

18. The method of claim 14, wherein the lens distortion corrections account for changes of the first surface and the second surface when projected through a lens of a display device.

19. The method of claim 14, wherein the first image source is from a virtual reality application, mixed reality application, or augmented reality application.

20. The method of claim 14, wherein the second image source is from a virtual reality application, mixed reality application, or augmented reality application.

21. The method of claim 14, wherein the composite image is presented on a two dimensional surface in the virtual environment.

22. The method of claim 14, wherein generating the composite image further comprises contemporaneously applying the position corrections the lens distortion corrections to the first surface and the second surface in one step.

23. A non-transitory computer-readable medium storing instructions executable by a computer device, comprising:
at least one instruction for causing the computer device to receive at least a first surface from a first image source and a second surface from a second image source, wherein the first surface and the second surface have original pixel positions in at least one original virtual environment;
at least one instruction for causing the computer device to generate a composite image for presentation in a virtual environment with a combined first surface and second surface by projecting the first surface and the second surface into final pixel positions and working backwards from the final pixel positions to contemporaneously apply position corrections and lens distortion corrections to the first surface and the second surface directly into the composite image while blending the first surface and the second surface into respective final pixel positions in the composite image by transforming coordinates of the original pixel positions of the first surface and the second surface in the at least one original virtual environment to coordinates of the final pixel positions in the virtual environment, wherein the position corrections and the lens distortion corrections occur in a single graphics processing unit (GPU) shader without storing images in intermediate spaces; and
at least one instruction for causing the computer device to transmit, to a downstream consumer, the composite image for presentation in the virtual environment.

* * * * *